(Model.)
E. NEFF & W. T. BUTLER.
VEHICLE AXLE LUBRICATOR.
No. 245,857. Patented Aug. 16, 1881.
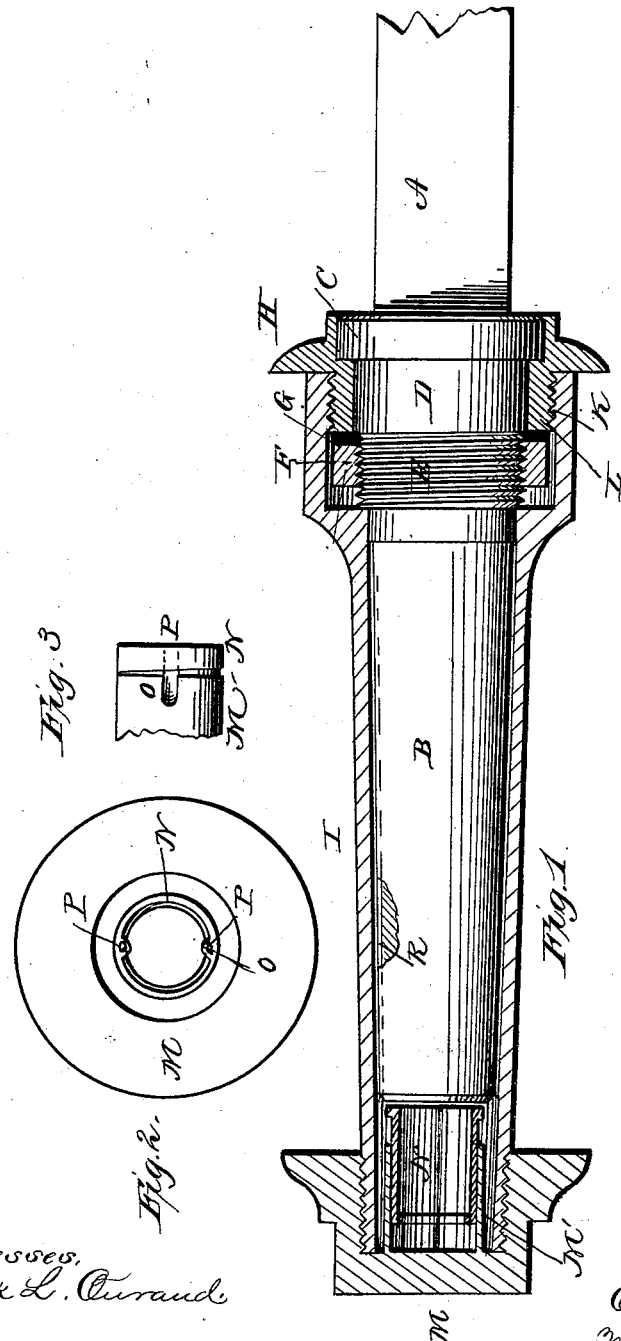
Witnesses
Franck L. Durand
H. Aubrey Toulmin
Inventor
Elijah Neff and
William T. Butler
By Alexander & Mason
Attorney
N. PETERS, Photo-Lithographer, Washington, D. C.

UNITED STATES PATENT OFFICE.

ELIJAH NEFF AND WILLIAM T. BUTLER, OF ROCHESTER, INDIANA.

VEHICLE-AXLE LUBRICATOR.

SPECIFICATION forming part of Letters Patent No. 245,857, dated August 16, 1881.

Application filed May 17, 1881. (Model.)

*To all whom it may concern:*

Be it known that we, ELIJAH NEFF and WILLIAM T. BUTLER, of Rochester, in the county of Fulton, and in the State of Indiana, have invented certain new and useful Improvements in Axle-Lubricators; and we do hereby declare that the following is a full, clear, and exact description thereof, reference being had to the accompanying drawings, and to the letters of reference marked thereon, making a part of this specification.

This invention relates to certain improvements in axles for vehicles; and it has for its objects to provide a means whereby the box may be adjusted upon the spindle to compensate for wear and the entrance of sand between the box and spindle, and the lubricant delivered between the spindle and the box automatically, as required, in the manner more fully hereinafter specified. These objects we attain by the mechanism and apparatus illustrated in the accompanying drawings, in which—

Figure 1 represents a view, partly in longitudinal section and partly in elevation, of our improvement. Fig. 2 represents a detached view of the front nut and oiling device, and Fig. 3 represents a detached view of the oiling device.

The letter A indicates the axle, and B the spindle. The axle is provided at the base of the spindle with a shoulder, C. Immediately forward of the shoulder the spindle is enlarged, as indicated by the letter D, and the enlarged portion is screw-threaded, as indicated by E.

The letter F' indicates a female screw-collar, adapted to be secured upon the screw-threaded portion of the spindle; and G, an annular packing, adapted to be confined between the nut H and collar F', holding the nut closely against the shoulder and forming a tight joint, to prevent the escape of lubricant.

The letter I indicates the axle-box, which is internally screw-threaded at K, and fits on the screw-threaded portion E of the nut H. The forward end of the box is externally screw-threaded, over which sets an internally screw-threaded cap, M. The interior of the cap is provided with a lubricant-receptacle, M', having a telescopic extension, N, the outward movement of which is limited by the lugs O, which set in the grooves P, terminating at the bottom of the telescopic section.

The operation of our invention is as follows: The nut H is placed upon the spindle and is pushed back against the shoulder C. The collar F is then screwed up against the nut H, the washer G being interposed between the collar and the nut. The box is then screwed upon the threaded portion I of the nut H. The telescopic portion N of the lubricant-receptacle is then drawn out to its full extent and the receptacle nearly filled with oil. A packing of wool or cotton is then placed in the vacant space, the end of the telescopic extension is placed against the end of the spindle, and the cap is screwed home, forcing the oil through the groove R throughout the length of the spindle. The nut H, to which the box is secured, revolves freely upon the spindle.

Having thus described our invention, what we claim, and desire to secure by Letters Patent, is—

1. In combination with the spindle and box, the screw-cap at its forward end, provided with an oil-receptacle and telescopic extension, the whole adapted to operate substantially in the manner specified.

2. The combination of the spindle B, the shoulder C on the axle, the enlarged screw-threaded portion D, the nut mounted loosely thereon, the collar D and washer G, the box I and forward screw-cap, M, the oil-receptacle M', and extension N, all arranged to operate substantially as specified.

In testimony that we claim the foregoing we have hereunto set our hands this 2d day of May, 1881.

ELIJAH NEFF.
WILLIAM T. BUTLER.

Witnesses:
J. J. MCCARTHY,
E. R. HERMAN.